United States Patent
Glass et al.

(10) Patent No.: US 9,171,000 B2
(45) Date of Patent: Oct. 27, 2015

(54) METHOD AND SYSTEM FOR MAPPING SHORT TERM RANKING OPTIMIZATION OBJECTIVE TO LONG TERM ENGAGEMENT

(71) Applicant: YAHOO! INC., Sunnyvale, CA (US)

(72) Inventors: Alyssa Glass, Sunnyvale, CA (US); Xing Yi, Milpitas, CA (US); Jean-Marc Langlois, Menlo Park, CA (US)

(73) Assignee: YAHOO! INC., Sunnyvale, CA (US)

( * ) Notice: Subject to any disclaimer, the term of this patent is extended or adjusted under 35 U.S.C. 154(b) by 286 days.

(21) Appl. No.: 13/833,430

(22) Filed: Mar. 15, 2013

(65) Prior Publication Data

US 2014/0279736 A1    Sep. 18, 2014

(51) Int. Cl.
| | |
|---|---|
| G06N 99/00 | (2010.01) |
| G06F 17/30 | (2006.01) |
| G06Q 30/02 | (2012.01) |
| H04N 21/442 | (2011.01) |
| H04N 21/466 | (2011.01) |

(52) U.S. Cl.
CPC .... *G06F 17/30029* (2013.01); *G06F 17/30867* (2013.01); *G06Q 30/0282* (2013.01); *H04N 21/44213* (2013.01); *H04N 21/4668* (2013.01); *G06N 99/005* (2013.01)

(58) Field of Classification Search
CPC ................. G06N 99/00; G06N 99/005; G06F 17/30029; G06F 17/30867; G06Q 30/0282; H04N 21/466
USPC .......................................................... 706/12
See application file for complete search history.

(56) References Cited

U.S. PATENT DOCUMENTS

| | | | |
|---|---|---|---|
| 2007/0061195 A1* | 3/2007 | Liu et al. .......................... | 705/14 |
| 2007/0239518 A1* | 10/2007 | Chung et al. .................... | 705/10 |
| 2007/0239535 A1* | 10/2007 | Koran et al. ..................... | 705/14 |
| 2007/0260596 A1* | 11/2007 | Koran et al. ....................... | 707/5 |
| 2008/0209343 A1* | 8/2008 | Macadaan et al. ............. | 715/747 |
| 2009/0144635 A1* | 6/2009 | Miyazaki et al. .............. | 715/747 |
| 2011/0161331 A1* | 6/2011 | Chung et al. .................. | 707/751 |
| 2011/0231241 A1* | 9/2011 | Kesari et al. ............... | 705/14.42 |
| 2012/0001916 A1* | 1/2012 | Majors et al. ................. | 345/440 |
| 2012/0089623 A1* | 4/2012 | Sobotka et al. ............... | 707/751 |

OTHER PUBLICATIONS

Bennett P. et al., "Modeling the Impact of Short- and Long-Term Behavior on Search Personalization", SIGIR'12, Aug. 12-16, 2012, Portland, Oregon, USA.*

(Continued)

*Primary Examiner* — Jeffrey A Gaffin
*Assistant Examiner* — Dave Misir
(74) *Attorney, Agent, or Firm* — Pillsbury Winthrop Shaw Pittman LLP

(57) ABSTRACT

Method, system, and programs for identifying a target metric. In one example, at least one first type of metric computed based on a first period associated with a first length of time is measured for each of a plurality of users. At least one second type of metric computed based on a second period associated with a second length of time is measured for each of the plurality of users. The second length of time is larger than the first length of time. Correlations between each of the at least one first type of metric and each of the at least one second type of metrics are computed with respect to the plurality of users. A target metric is identified from the at least one first type of metric based on the correlations. The target metric is correlated with the at least one second type of metric.

16 Claims, 10 Drawing Sheets

(56) References Cited

OTHER PUBLICATIONS

Xiang L. et al., "Temporal Recommendation on Graphs via Long- and Short-term Preference Fusion", KDD'10, Jul. 25-28, 2010, Washington, DC, USA, pp. 723-731.*

Li L. et al., "Dynamic Adaptation Strategies for Long-Term and Short-Term User Profile to Personalize Search", APWeb/WAIM 2007, LNCS 4505, pp. 228-240, 2007.*

* cited by examiner

METHOD AND SYSTEM FOR MAPPING SHORT TERM RANKING OPTIMIZATION OBJECTIVE TO LONG TERM ENGAGEMENT

CROSS-REFERENCE TO RELATED APPLICATION

The present application is related to a U.S. Patent Application having an application Ser. No. 13/836,218, filed on even date, entitled METHOD AND SYSTEM FOR MEASURING USER ENGAGEMENT FROM STREAM DEPTH, a U.S. Patent Application having an application Ser. No. 13/836,556, filed on even date, entitled METHOD AND SYSTEM FOR MEASURING USER ENGAGEMENT USING CLICK/SKIP IN CONTENT STREAM, and a U.S. Patent Application having an application Ser. No. 13/836,758, filed on even date, entitled METHOD AND SYSTEM FOR MEASURING USER ENGAGEMENT USING SCROLL DWELL TIME, all of which are incorporated herein by reference in their entireties.

BACKGROUND

1. Technical Field

The present teaching relates to methods, systems, and programming for identifying a target metric. Particularly, the present teaching relates to methods, systems, and programming for identifying a target metric for optimizing content personalization and recommendation.

2. Discussion of Technical Background

Personalized content recommendation systems are a subclass of information filtering systems that predict an "interest" that a user would have in online content (such as articles, news, music, books, or movies), using a model built based on the characteristics of users and the content related thereto and the user's online behaviors. Personalized content recommendation systems usually optimize towards a known short-term target, but may not be tuned/optimized towards long-term goals because the optimization needs to assign a "score" immediately at the time of the learning. Typically, machine learning ranking algorithms need a fine-granular learning target per article per user, in order to be able to recommend good articles for each different user. Therefore, the learning-target typically can only be computed within a short-time period. As a result, it is very difficult to train personalized content recommendation systems to optimize for long-term goals like user engagement.

Most known prior works targeted on short-term metrics, in particular, click-through rate (CTR), which, however, does not necessarily lead to the long-term engagement that is ultimately desired. CTR has been widely used because it has a direct, measurable impact on short-term revenue for example, through advertisement impressions. Although many believed that it does not necessarily lead to long-term engagement, there is no known way to provide a better short-term optimization target. Therefore, there is a need to provide an improved solution for identifying a target metric for optimizing personalized content recommendation systems to solve the above-mentioned problems.

SUMMARY

The present teaching relates to methods, systems, and programming for identifying a target metric. Particularly, the present teaching relates to methods, systems, and programming for identifying a target metric for optimizing content personalization and recommendation.

In one example, a method, implemented on at least one machine each of which has at least one processor, storage, and a communication platform connected to a network for identifying a target metric, is disclosed. At least one first type of metric computed based on a first period associated with a first length of time is measured for each of a plurality of users. At least one second type of metric computed based on a second period associated with a second length of time is measured for each of the plurality of users. The second length of time is larger than the first length of time. Correlations between each of the at least one first type of metric and each of the at least one second type of metrics are computed with respect to the plurality of users. A target metric is identified from the at least one first type of metric based on the correlations. The target metric is correlated with the at least one second type of metric.

In a different example, a system for identifying a target metric is disclosed. The system includes a short-term behavior metrics measurement unit, a long-term engagement metrics measurement unit, a correlation analysis unit, and a target metric identification unit. The short-term behavior metrics measurement unit is configured to measure at least one first type of metric computed based on a first period associated with a first length of time for each of a plurality of users. The long-term engagement metrics measurement unit is configured to measure at least one second type of metric computed based on a second period associated with a second length of time for each of the plurality of users. The second length of time is larger than the first length of time. The correlation analysis unit is configured to compute correlations between each of the at least one first type of metric and each of the at least one second type of metric with respect to the plurality of users. The target metric identification unit is configured to identify a target metric from the at least one first type of metric based on the correlations. The target metric is correlated with the at least one second type of metric.

Other concepts relate to software for identifying a target metric. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for identifying a target metric, wherein the information, when read by the machine, causes the machine to perform a series of steps. At least one first type of metric computed based on a first period associated with a first length of time is measured for each of a plurality of users. At least one second type of metric computed based on a second period associated with a second length of time is measured for each of the plurality of users. The second length of time is larger than the first length of time. Correlations between each of the at least one first type of metric and each of the at least one second type of metrics are computed with respect to the plurality of users. A target metric is identified from the at least one first type of metric based on the correlations. The target metric is correlated with the at least one second type of metric.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of identifying a target metric for optimizing personalized content recommendation. The method and system as disclosed herein allow any personalized content recommendation system to focus on long-term user engagement for optimization, rather than requiring it to optimize towards short-term goals. For example, the method and system as disclosed herein correlate short-term behavior metrics with long-term engagement metrics. These short-term behavior metrics are then mapped to optimization targets that can be used to optimize the ranking model of the personalized content recommendation. This allows the personalized content recommendation system to be effectively optimized for long-term engagement using short-term metrics that are not necessarily obviously related to the long-term objective, which, however, may not be used directly.

Additional novel features will be set forth in part in the description which follows, and in part will become apparent to those skilled in the art upon examination of the following and the accompanying drawings or may be learned by production or operation of the examples. The novel features of the present teaching may be realized and attained by practice or use of various aspects of the methodologies, instrumentalities and combinations set forth in the detailed examples discussed below.

Figure 1:
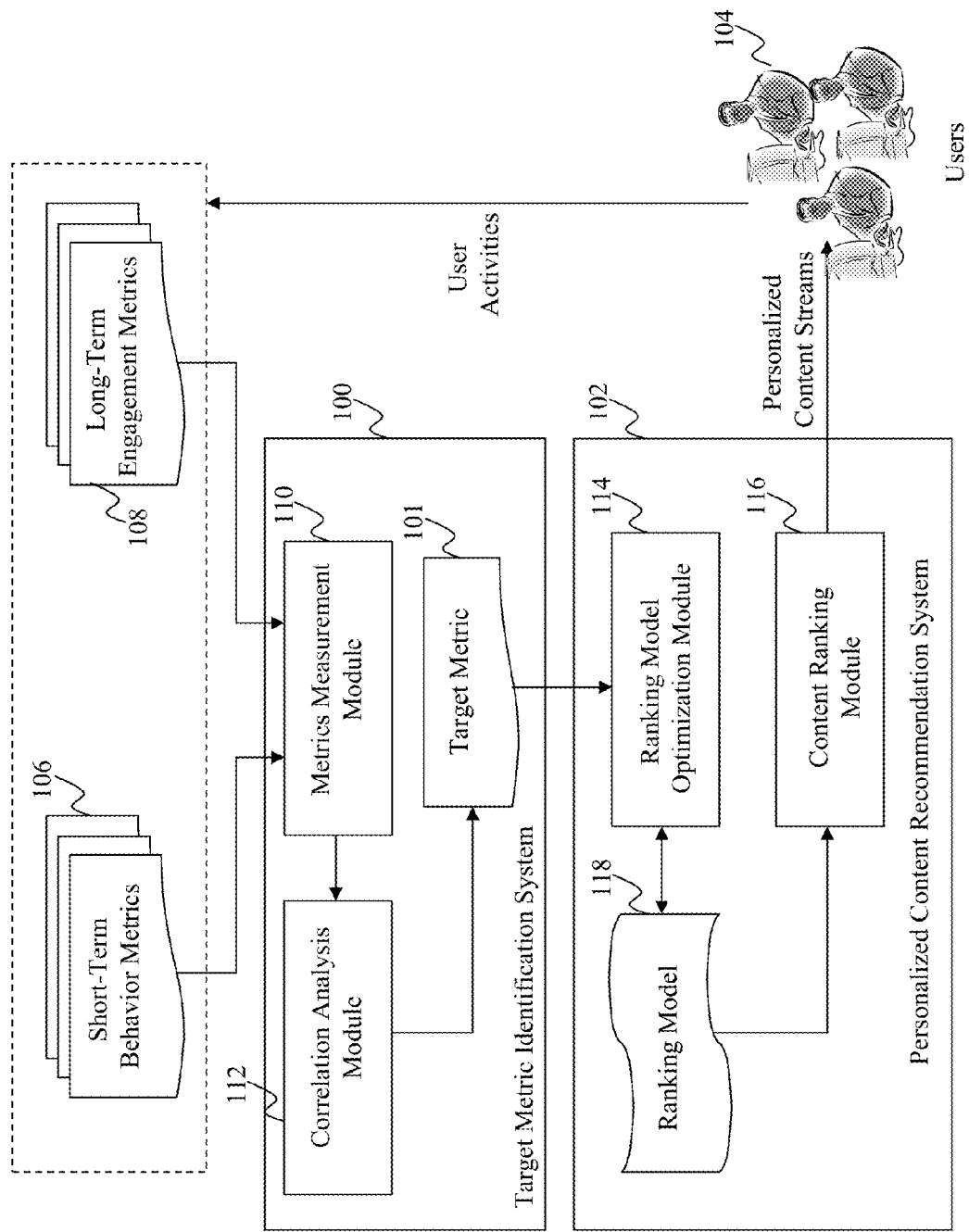
FIG. 1 is a high level exemplary system diagram of a target metric identification system, according to an embodiment of the present teaching.

FIG. 1 is a high level exemplary system diagram of a target metric identification system, according to an embodiment of the present teaching. The target metric identification system 100 is configured to identify one or more target metrics 101 as optimization targets for improving a personalized content recommendation system 102, thereby promoting long-term engagement of users 104 with the personalized content recommendation system 102. Users 104 of the personalized content recommendation system 102 may receive personalized content streams and interact with the content streams through different user activities, such as an explicit action like clicking in a content stream or an implicit action like viewing content without clicking it. The content referred herein includes, but is not limited to, for example, text, audio, image, video or any combination thereof. Based on the user activities with respect to the content streams, various metrics may be proposed as candidates for measuring user engagement with the personalized content recommendation system 102. Depending on the relative measurement time periods, the metrics may be classified as either short-term behavior metrics 106 or long-term engagement metrics 108. The long-term engagement metrics 108 are considered as indicators of user engagement as they are all long term in nature, and include for example, repeated sessions/streams or days per week, total or average clicks, view, and dwell time over many sessions/streams or days. On the other hand, the short-term behavior metrics 106 try to measure short-term personalization effect or stream behavior, e.g., within one week, in isolation. They are usually more localized metrics compared with the long-term engagement metrics 108, e.g., within-session/stream metrics.

In this example, the target metric identification system 100 includes the metrics measurement module 110 for measuring short-term behavior metrics 106 and long-term engagement metrics 108 across a number of users 104 and a correlation analysis module 112 for identifying a target metric 101 based on the correlations between each short-term behavior metric 106 and each long-term engagement metric 108 across the users 104. The personalized content recommendation system 102 includes a ranking model optimization module 114 and a content ranking module 116. The target metric(s) 101 are used as optimization target(s) by the ranking model optimization module 114 for tuning a ranking model 118 using machine learning approaches. The dynamically tuned ranking model 118 is utilized by the content ranking module 116 for recommending the top ranked content to users 104 as personalized content streams.

Figure 2:
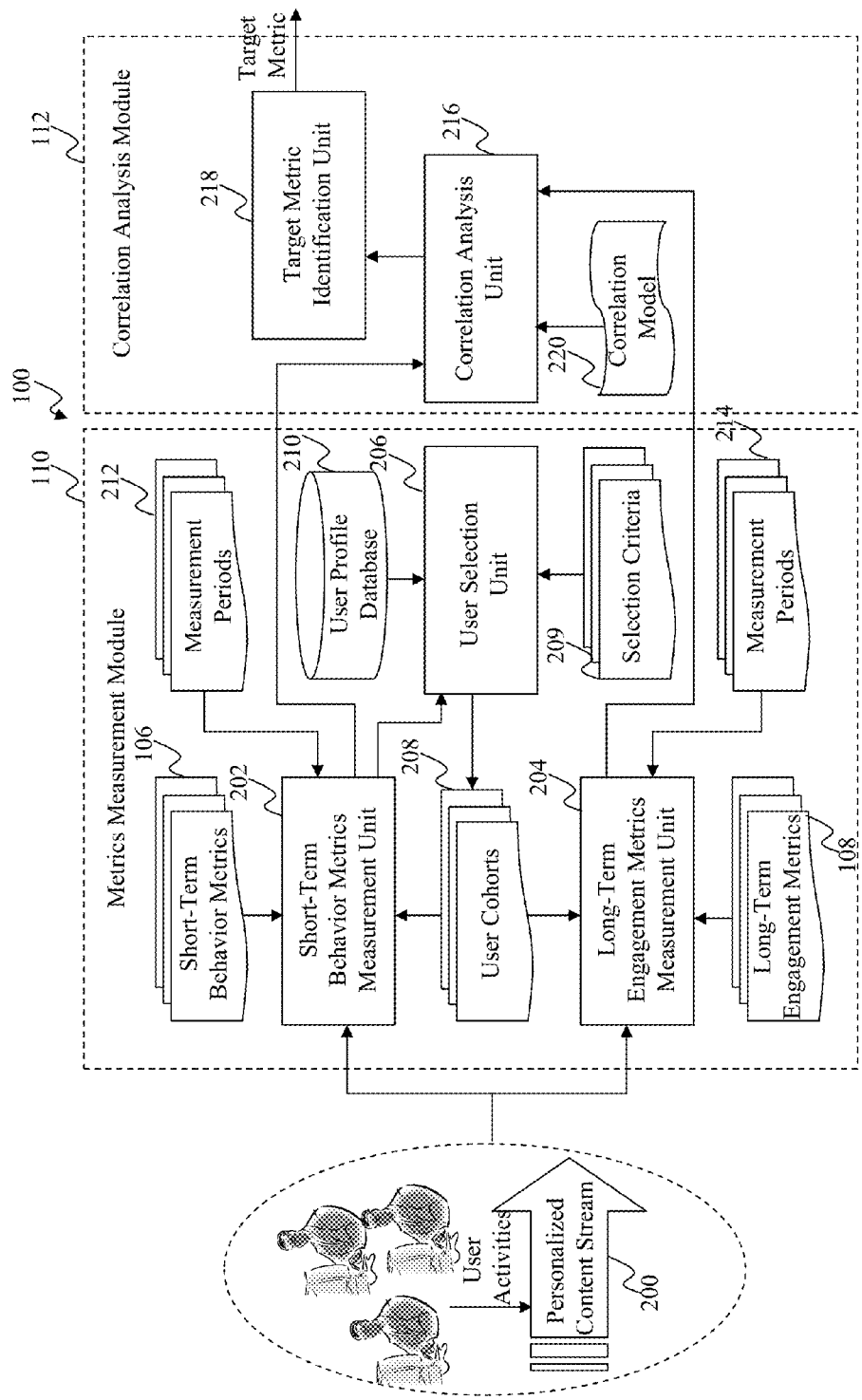
FIG. 2 is an exemplary function block diagram of the target metric identification system shown in FIG. 1, according to an embodiment of the present teaching.

FIG. 2 is an exemplary function block diagram of the target metric identification system 100 shown in FIG. 1, according to an embodiment of the present teaching. The target metric identification system 100 includes the metrics measurement module 110 and correlation analysis module 112. In this example, the metrics measurement module 110 is responsible for measuring short-term behavior metrics and long-term engagement metrics based on user activities with respect to personalized content streams 200 and providing measurement data to the correlation analysis module 112. The correlation analysis module 112, in this example, is responsible for identifying one or more target metrics based on the received data from the metrics measurement module 110. As described before, the identified target metric(s) may be used as optimization target for improving a personalized content recommendation system.

In this example, the metrics measurement module 110 includes a short-term behavior metrics measurement unit 202, a long-term engagement metrics measurement unit 204, and a user selection unit 206. The user selection unit 206 is configured to determine one or more target user cohorts 208 based on selection criteria 209. Each target user cohort 208 includes a group of users sharing the same or similar interests, attributes, or behavior patterns. In one example, the target user cohorts 208 may be determined based on analyzing user profiles in a user profile database 210. In another example, user's short-term on page behavior patterns or visit patterns may be obtained by the short-term behavior metrics measurement unit 202 and used for determining target user cohorts 208. It is understood that other selection criteria 209, such as demographics, may also be considered by the user selection unit 206 for determining target user cohorts 208.

The short-term behavior metrics measurement unit 202 in this example is configured to measure each of the short-term behavior metrics 106 for all the users in the target user cohort 208 during a first measurement period 212, i.e., a qualifying period, such as one week. The measurement may be performed in various ways, such as by receiving signals from a web beacon, receiving signals from a tool bar, and analyzing event logs, e.g., browser-cookies. User's short-term behavior patterns during the qualifying period may be analyzed and provided to the user selection unit 206 as another factor to determine target user cohorts 208. For example, users who engaged with the personalized content streams 200 at least five days in one week may form a high frequency cohort, and users who clicked in the personalized content streams 200 but never fetched a new batch may form a pure clicker cohort.

The long-term engagement metrics measurement unit 204 in this example is configured to measure each of the long-term engagement metrics 108 for the users in the target user cohort 208 during a second measurement period 214, i.e., an engagement period, such as three weeks or three months. The second measurement period 214 is longer than the first measurement period 212. In one example, the second measurement period 214 may immediately follow the first measurement period 212. The measurement of long-term engagement metrics 108 may be performed in similar ways as the short-term behavior metrics 106. It is understood that in some examples, the long-term engagement metrics measurement unit 204 may not measure all the users in the targets user cohort 208, but only some of them.

In this example, the correlation analysis module 112 includes a correlation analysis unit 216 and a target metric identification unit 218. The correlation analysis unit 216 is configured to receive measurement data of each short-term behavior metric 106 and each long-term engagement metric 108 for the target user cohort 208 and compute correlations between each short-term behavior metric 106 and each long-term engagement metric 108 for the target user cohort 208 based on a correlation model 220. The correlation model 220 may be, for example, liner regression, non-linear regression, logistic regression, or Pearson's correlation. It is understood that, in addition to analyzing the correlation between each pair of short-term behavior metric 106 and long-term engagement metric 108 for each user cohort 208, the correlation analysis unit 216 may run multi-variable regressions for various user cohorts to see relative contribution of various metrics. It is understood that in some examples, data points of short-term behavior metrics may be binned to remove noise. In one example, at least 100 users are included in each bin. If binned short-term behavior metrics are used in correlation analysis, then an average value of long-term engagement metrics for users in each bin may be used against the short-term behavior metrics bin. The target metric identification unit 218 is configured to identify one or more target metrics, which have the strongest correlation with one or more long-term engagement metrics 108, e.g., with the highest statistical significance. In one example, when the strongest correlations are identified, a target "proxy" metric may be designed by the target metric identification unit 218 to optimize the short-term behavior metrics that were discovered to correlate best with long-term engagement. That is, the target metric may be one of the short-term behavior metrics 106, such as CTR, dwell time per content, click-skip rate (click odds), stream depth, or a different metric that correlates well with the short-term behavior metrics that were discovered to correlate best with long-term engagement, such as browser value (score related to stream depth), downstream engagement/sharing behavior, or any combination thereof.

Figure 3:
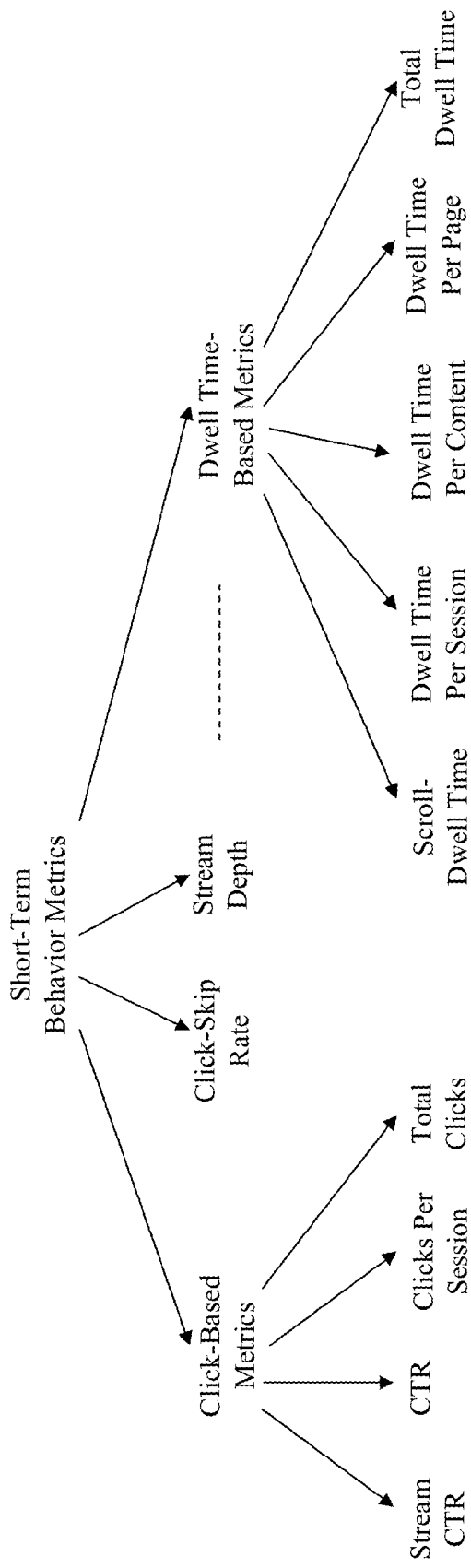
FIG. 3 illustrates exemplary short-term behavior metrics in the target metric identification system, according to different embodiments of the present teaching.

FIG. 3 illustrates exemplary short-term behavior metrics in the target metric identification system, according to different embodiments of the present teaching. The short-term behavior metrics may measure local interactions, e.g., within-session/stream interactions, for any given user. As shown in FIG. 3, the short-term behavior metrics include click-based metrics, such as stream CTR, CTR, clicks per session/stream, total clicks, click-skip rate (click odds), stream depth, and dwell time-based metrics such as scroll dwell time, dwell time per session/stream, dwell time per content, dwell time per page, and total dwell time. It is understood that any other short-term behavior metrics that measure local interactions between users and content streams may be included in the present teaching. Details of some short-term behavior metrics, such as click-skip rate (click odds), stream depth, and scroll dwell time are described a U.S. patent application having an application Ser. No. 13/836,218, filed on even date, entitled METHOD AND SYSTEM FOR MEASURING USER ENGAGEMENT FROM STREAM DEPTH, a U.S. patent application having an application Ser. No. 13/836,556, filed on even date, entitled METHOD AND SYSTEM FOR MEASURING USER ENGAGEMENT USING CLICK/SKIP IN CONTENT STREAM, and a U.S. patent application having an application Ser. No. 13/836,758, filed on even date, entitled METHOD AND SYSTEM FOR MEASURING USER ENGAGEMENT USING SCROLL DWELL TIME, all of which are incorporated herein by reference in their entireties.

Figure 4:
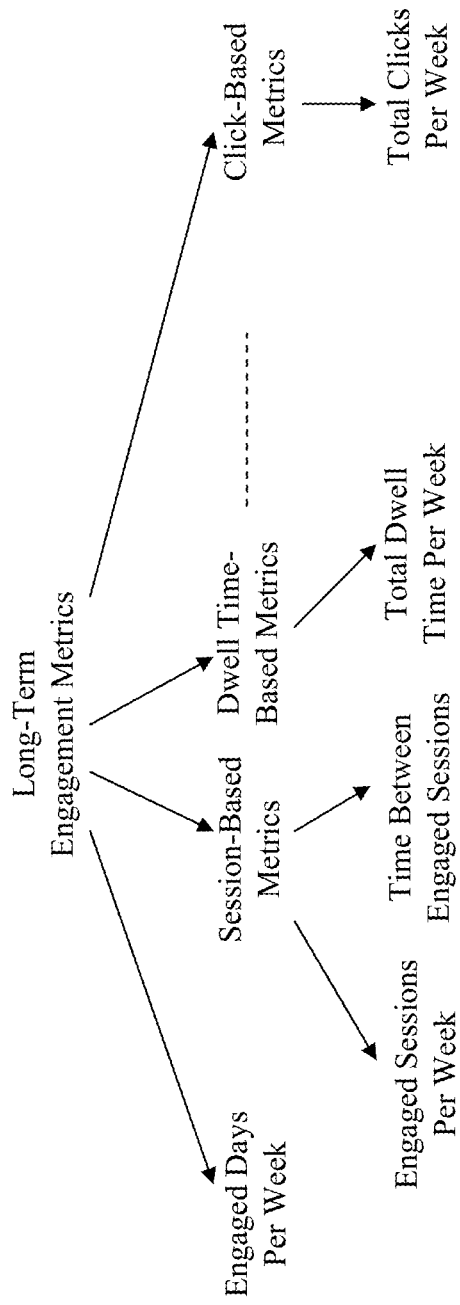
FIG. 4 illustrates exemplary long-term engagement metrics in the target metric identification system, according to different embodiments of the present teaching.

FIG. 4 illustrates exemplary long-term engagement metrics in the target metric identification system, according to different embodiments of the present teaching. The long-term engagement metrics may indicate the overall degree of engagement with a personalized content recommendation system (e.g., a content portal, a social media website, a search engine, an application, etc.) for any given user. As shown in FIG. 4, the long-term behavior metrics include engaged days per week, session/stream-based metrics such as engaged sessions/streams per week and time between engaged sessions/streams, dwell-time based metrics such as total dwell time per week, and click-based metrics such as total clicks per week. It is understood that any other long-term engagement metrics that indicate the overall degree of engagement may be included in the present teaching.

Figure 5:
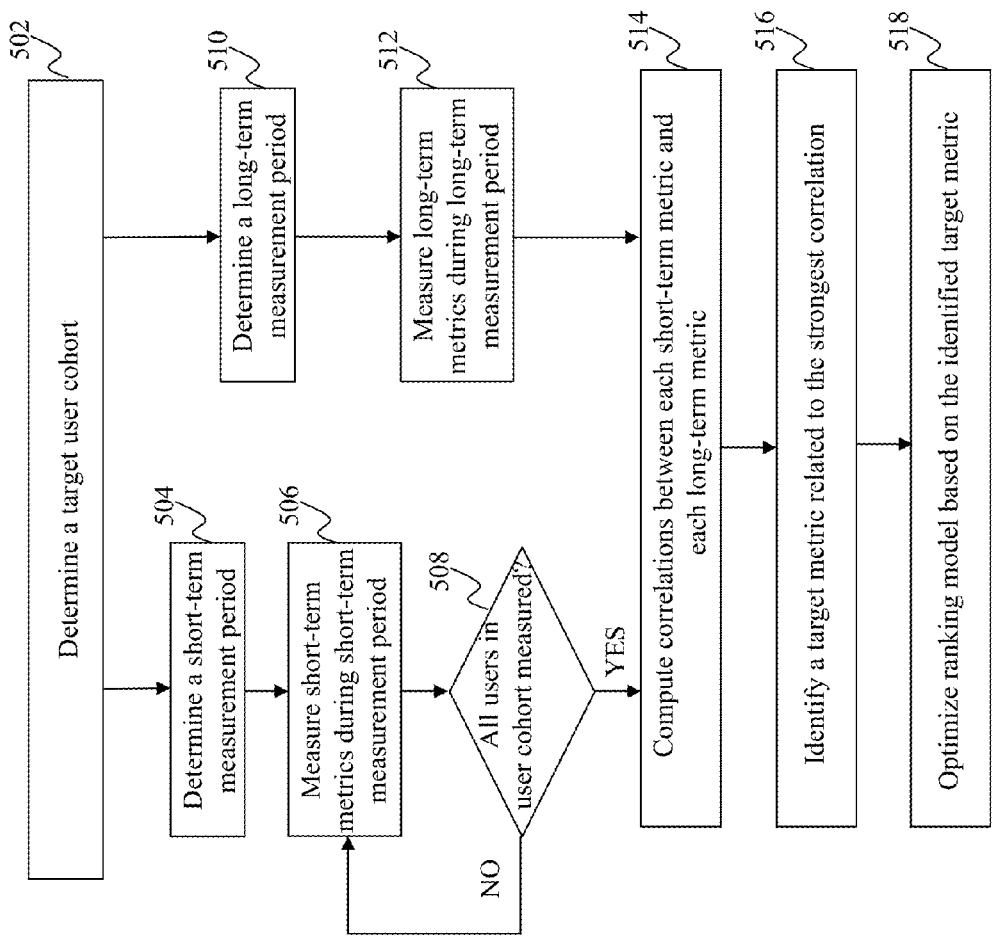
FIG. 5 is a flowchart of an exemplary process for identifying a target metric, according to an embodiment of the present teaching.

FIG. 5 is a flowchart of an exemplary process for identifying a target metric, according to an embodiment of the present teaching. Starting from 502, a target user cohort is determined target different user types appropriately. For example, users engaged with the content streams in a qualifying period, such as one week, are first identified. The engagement in this example is defined as either clicking on at least one piece of content or scrolling below a certain position, e.g., 17, in a content stream. The target user cohorts are then formed by breaking all the engaged users into groups based on user profiles, visit patterns, behaviors on page, demographics, etc. In one example, based on visit patterns, target user cohorts may include a high frequency user cohort in which users engaged with content streams for at least five days in a week, a medium frequency user cohort in which users engaged with content streams for at two to four days in a week, a low frequency user cohort in which users engaged with content streams for one day in a week, a weekday user cohort in which users engaged with content streams from Monday to Friday, and a weekend-also user cohort in which users engaged with content streams at least once on Saturday or Sunday. In another example, based on behaviors on page, target user cohorts may include a pure clicker user cohort in which users clicked in the content stream but never fetched a new batch, a pure fetcher user cohort in which users fetched at least one new batch but never clicked any content, a fuzzy clickers user cohort in which users did more clicks than fetches, a fuzzy browsers user cohort in which users did more fetches than clicks, and a top-only clickers user cohort in which users only clicked the top three pieces of content in each content stream. As described before, this may be performed by the user selection unit 206.

At 504, a short-term measurement period, i.e., a qualifying period, is determined for measuring each short-term behavior metric of the users in the target user cohort. For example, the short-term measurement period may be one week. Moving to 506, each short-term behavior metric is measured, for example, by the short-term behavior metrics measurement unit 202. Various techniques may be applied to measure the short-term behavior metrics depending on the different types of the metrics. In one example, JavaScript's web events may be used to generate a web beacon (web bug) embedded in the content stream and/or the webpage for monitoring user events, such as clicking, scrolling, viewing, and abandoning. The monitored used events then may be used for calculating values of short-term behavior metrics, such as dwell-time based metrics, click-based metrics, stream depth, click-skip rate, etc. In another example, event logs such as browser-cookies may be collected and analyzed to measure short-term behavior metrics. In still another example, a tool bar placed on the web browser may be used to collect user activity signals after the user logs in the tool bar. As each user data will be considered a data point, at 508, whether short-term data for all the users in the target user cohort has been obtained is determined. The processing may loop back to 506 until all the short-term user data has been collected.

At 510, a long-term measurement period, i.e., an engagement period, is determined for measuring each long-term engagement metric for the same users in the target user cohort. For example, the long-term measurement period may be three weeks or three months immediately following the short-term measurement period. Moving to 512, each long-term engagement metric is measured, for example, by the long-term engagement metrics measurement unit 204. Various techniques may be applied to measure the long-term engagement metrics depending on the different types of the metrics. In one example, event logs such as browser-cookies may be collected and analyzed to measure long-term engagement metrics, such as the number of engaged days, total dwell time, total clicks, etc. In another example, a web beacon (web bug) embedded in the content stream and/or the webpage may also be used to monitor user events for calculating values of long-term engagement metrics. In still another example, a tool bar placed on the web browser may be used to collect user activity signals after the user logs in the tool bar. It is understood that in some examples, even if all users in the targets user cohort have not had a long-term engagement metric measured, the processing may still continue to 514.

At 514, correlations between each short-term behavior metric and each long-term engagement metric for all the users in the target user cohort are computed. Known approaches, such as regression analysis, e.g., linear regression, non-linear regression, logistic regression, or multi-variables regression, and Pearson's correlation, may be applied to compute the correlations. As described before, this may be performed by the correlation analysis unit 216. In some examples, data points of short-term behavior metrics may be binned to remove noise. Moving to 516, a target metric is identified, for example, by the target metric identification unit 218. The target metric may have the strongest correlation with one or more long-term engagement metrics, e.g., with the highest statistical significance. In one example, when the strongest correlations are identified, a target "proxy" metric may be designed to optimize the short-term behavior metrics that were discovered to correlate best with long-term engagement. At 518, the identified target metric is used as the optimization target for optimizing the ranking model/function of a personalized content recommendation system.

Figure 6:
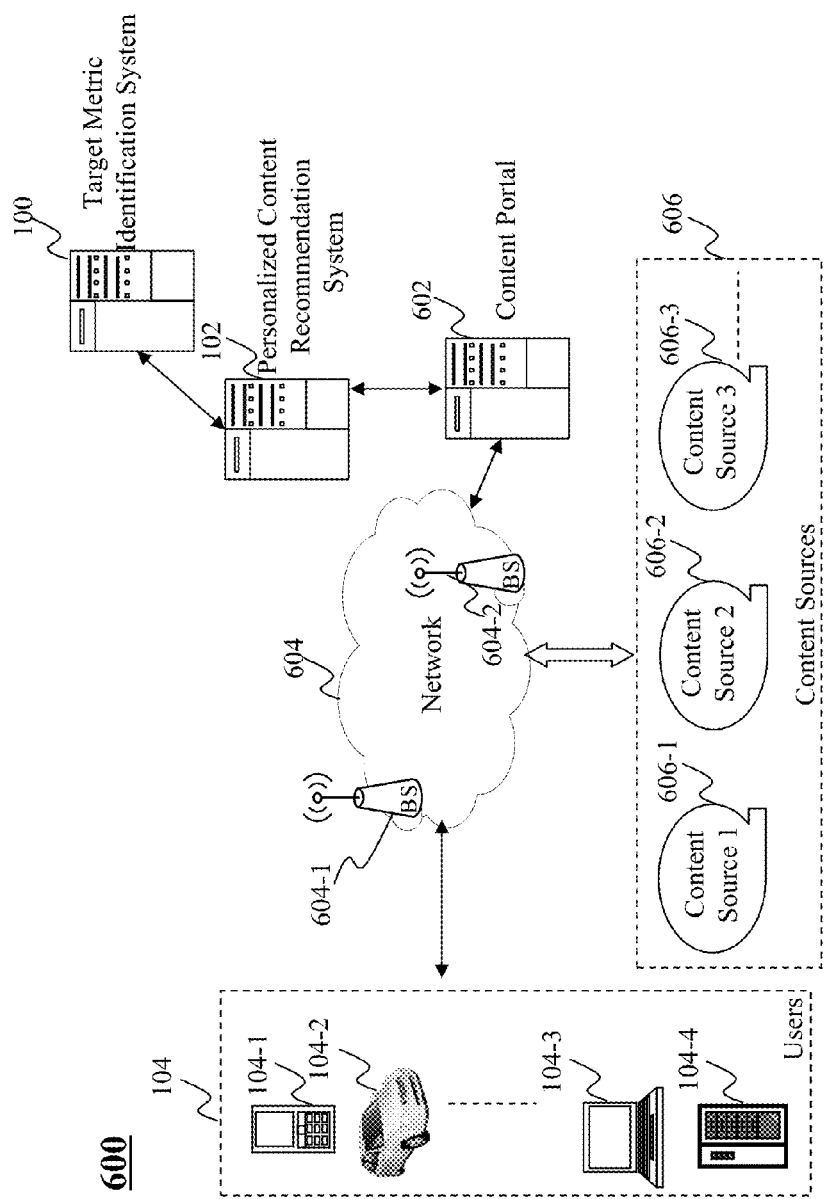
FIGS. 6-8 depict exemplary embodiments of a networked environment in which target metric identification is applied, according to different embodiments of the present teaching.
Figure 7:
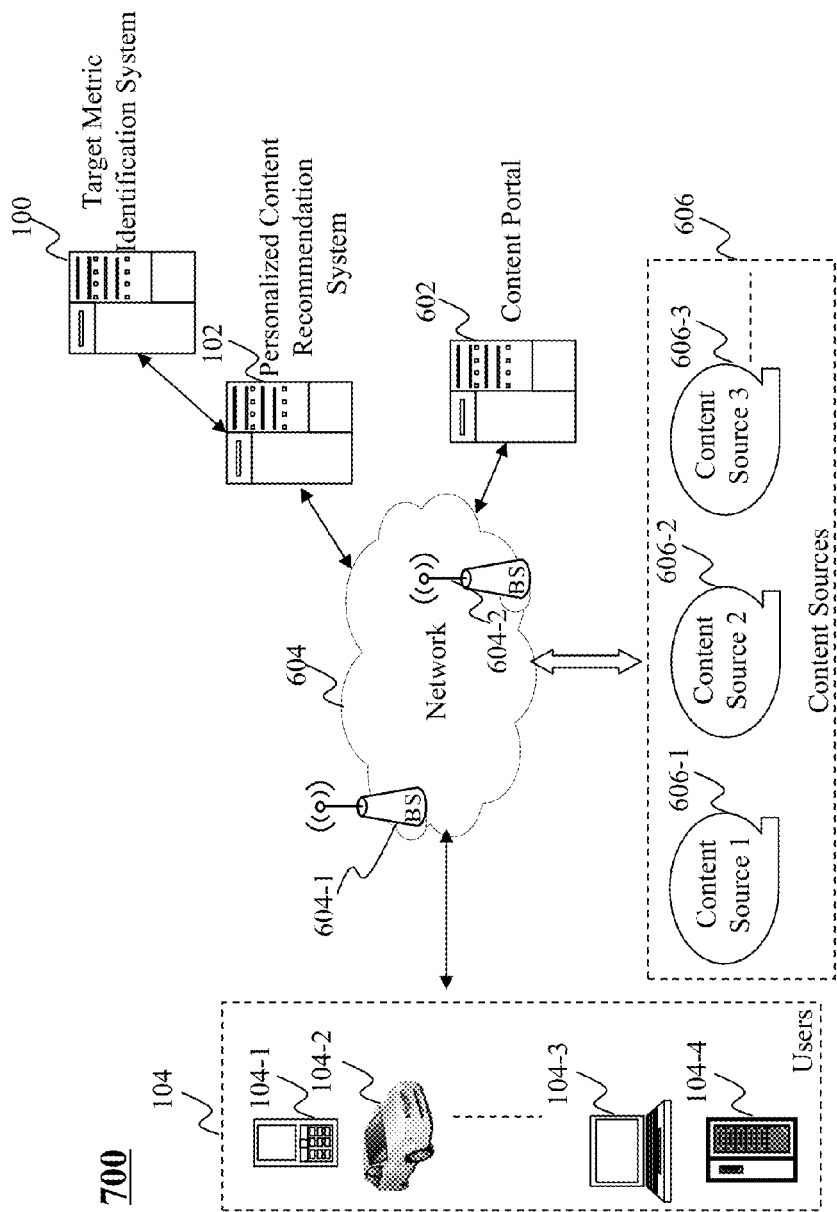
Figure 8:
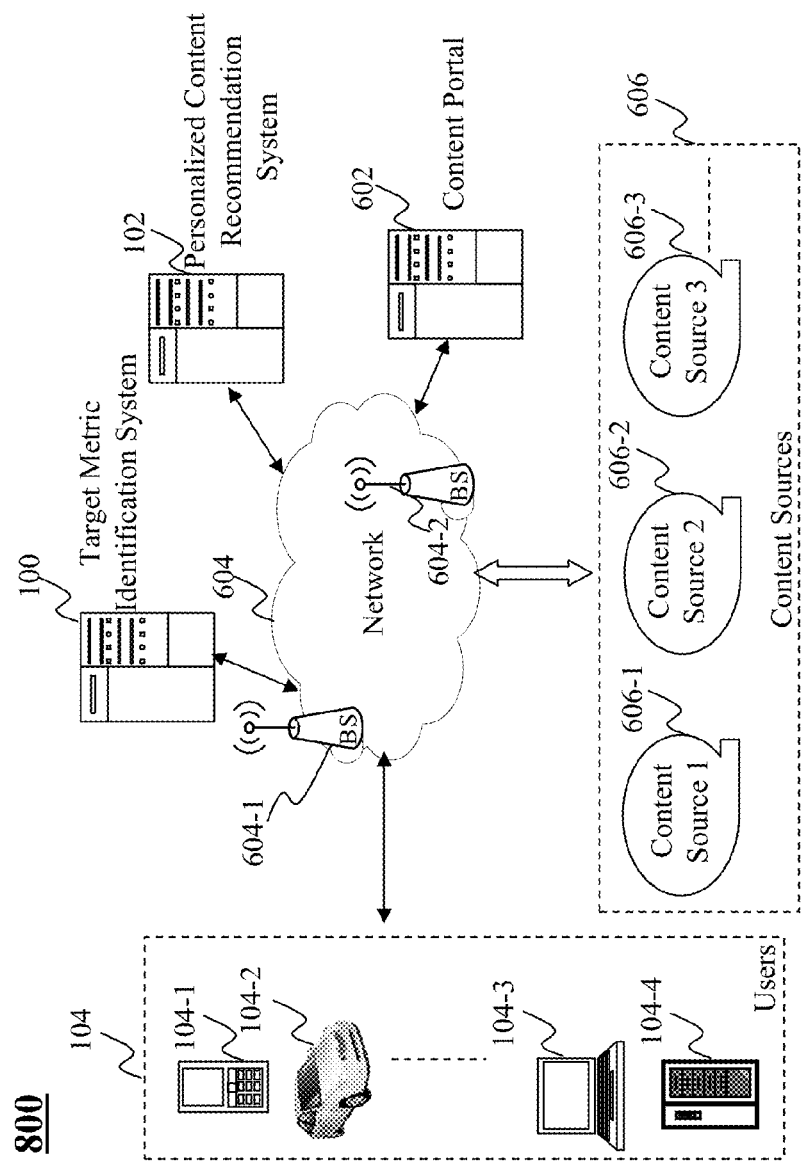

FIGS. 6-8 depict exemplary embodiments of a networked environment in which target metric identification is applied, according to different embodiments of the present teaching. In FIG. 6, an exemplary networked environment 600 includes the target metric identification system 100, the personalized content recommendation system 102, the users 104, a content portal 602, a network 604, and content sources 606. The network 604 may be a single network or a combination of different networks. For example, the network 604 may be a local area network (LAN), a wide area network (WAN), a public network, a private network, a proprietary network, a Public Telephone Switched Network (PSTN), the Internet, a wireless network, a virtual network, or any combination thereof. The network 604 may also include various network access points, e.g., wired or wireless access points such as base stations or Internet exchange points 604-1, . . . , 604-2, through which a data source may connect to the network 604 in order to transmit information via the network 604.

Users 104 may be of different types such as users connected to the network 604 via different user devices, for example, a desktop computer 104-4, a laptop computer 104-3, a mobile device 104-1, or a built-in device in a motor vehicle 104-2. A user 104 may send a request and provide basic user information to the content portal 602 (e.g., a search engine, a social media website, etc.) via the network 604 and receive personalized content streams from the content portal 602 through the network 604. The personalized content recommendation system 102 in this example may work as back-end support to recommend personalized content for the user 104 to the content portal 602. In this example, the target metric identification system 100 may also serve as backend support for the personalized content recommendation system 102. As described before, the target metric identification system 100 may identify one or more target metrics as optimization targets for improving the ranking model used by the personalized content recommendation system 102.

The content sources 606 include multiple third-party content sources 606-1, 606-2, 606-3. A content source may correspond to a website hosted by an entity, whether an individual, a business, or an organization such as USPTO.gov, a content provider such as cnn.com and facebook.com, or a content feed source such as Twitter or blogs. The personalized content recommendation system 102 may access any of the content sources 606-1, 606-2, 606-3 to obtain information related to the users 104 to construct user profiles and/or collect content to build its content pool. For example, the personalized content recommendation system 102 may fetch content, e.g., websites, through its crawler.

FIG. 7 presents a similarly networked environment as what is shown in FIG. 6 except that the personalized content recommendation system 102 is configured as an independent service provider that interacts with the users 104 directly to provide personalized content recommendation service. In the exemplary networked environment 600, the personalized content recommendation system 102 may receive a request with some basic information from a user 104 and provide personalized content streams to the user 104 directly without going through a third-party content portal 602.

FIG. 8 presents a similarly networked environment as what is shown in FIG. 7 except that the target metric identification system 100 in the exemplary networked environment 600 is also configured as an independent service provider to provide target metric identification service for optimizing personalization.

Figure 9:
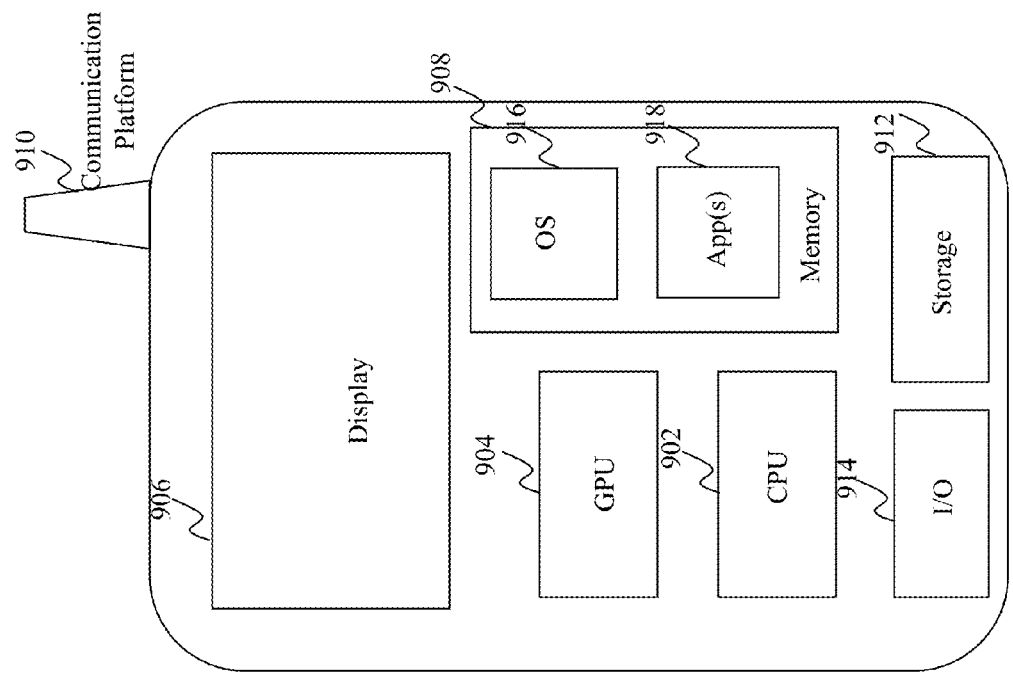
FIG. 9 depicts a general mobile device architecture on which the present teaching can be implemented.

FIG. 9 depicts a general mobile device architecture on which the present teaching can be implemented. In this example, the user device on which personalized content is presented is a mobile device 900, including but is not limited to, a smart phone, a tablet, a music player, a handled gaming console, a global positioning system (GPS) receiver. The mobile device 900 in this example includes one or more central processing units (CPUs) 902, one or more graphic processing units (GPUs) 904, a display 906, a memory 908, a communication platform 910, such as a wireless communication module, storage 912, and one or more input/output (I/O) devices 914. Any other suitable component, such as but not limited to a system bus or a controller (not shown), may also be included in the mobile device 900. As shown in FIG. 9, a mobile operating system 916, e.g., iOS, Android, Windows Phone, etc., and one or more applications 918 may be loaded into the memory 908 from the storage 912 in order to be executed by the CPU 902. The applications 918 may include a browser or any other suitable mobile apps for receiving and rendering personalized content streams on the mobile device 900. Execution of the applications 918 may cause the mobile device 900 to perform the processing as described above, e.g., in FIGS. 6-8. For example, the display of personalized content to the user may be made by the GPU 904 in conjunction with the display 906. User interactions with the personalized content streams may be achieved via the I/O devices 914 and provided to the target metric identification system 100 via the communication platform 910.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 10:
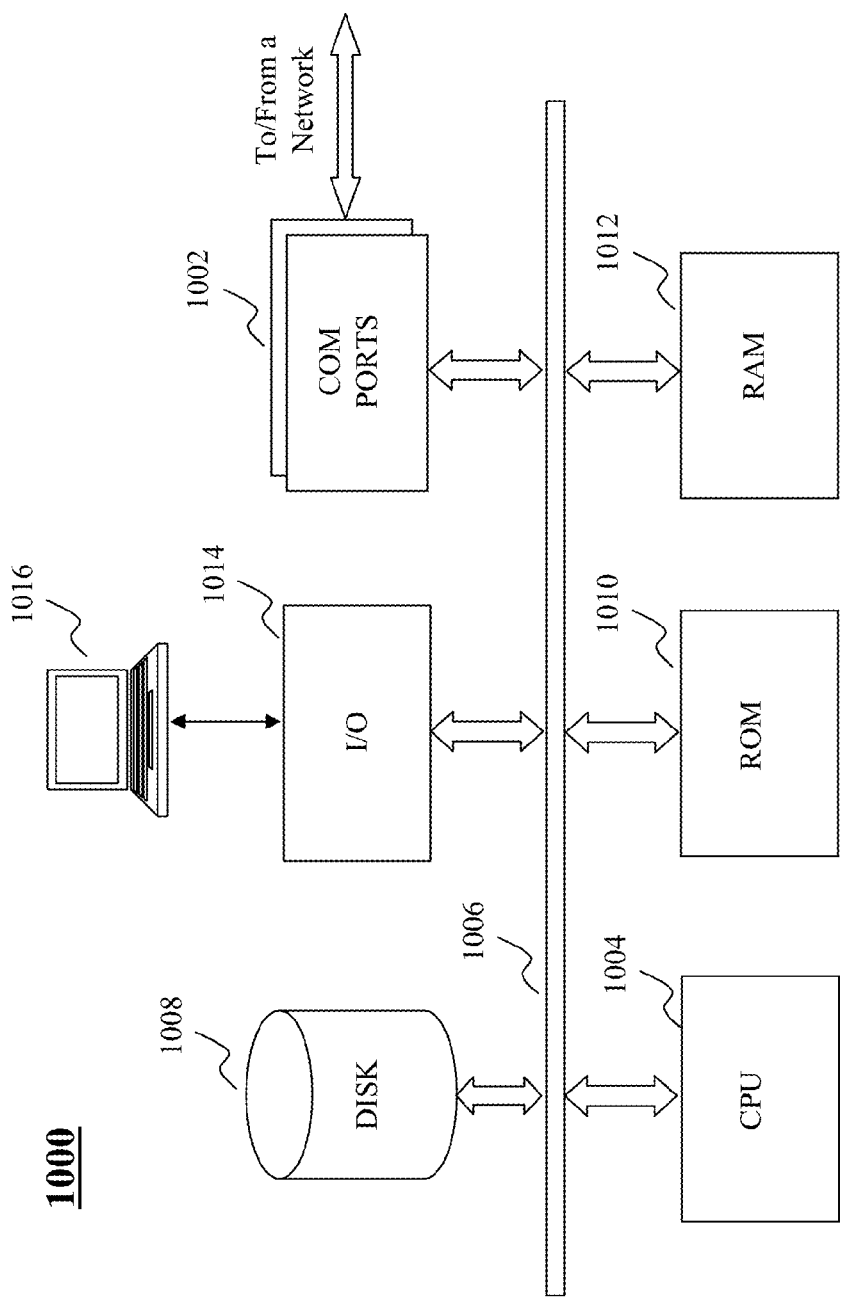
FIG. 10 depicts a general computer architecture on which the present teaching can be implemented.

FIG. 10 depicts a general computer architecture on which the present teaching can be implemented and has a functional block diagram illustration of a computer hardware platform that includes user interface elements. The computer may be a general-purpose computer or a special purpose computer. This computer 1000 can be used to implement any components of the target metric identification architecture as described herein. Different components of the system in the present teaching can all be implemented on one or more computers such as computer 1000, via its hardware, software program, firmware, or a combination thereof. Although only one such computer is shown, for convenience, the computer functions relating to the target metric identification may be implemented in a distributed fashion on a number of similar platforms, to distribute the processing load.

The computer 1000, for example, includes COM ports 1002 connected to and from a network connected thereto to facilitate data communications. The computer 1000 also includes a central processing unit (CPU) 1004, in the form of one or more processors, for executing program instructions. The exemplary computer platform includes an internal communication bus 1006, program storage and data storage of different forms, e.g., disk 1008, read only memory (ROM) 1010, or random access memory (RAM) 1012, for various data files to be processed and/or communicated by the computer, as well as possibly program instructions to be executed by the CPU. The computer 1000 also includes an I/O component 1014, supporting input/output flows between the computer and other components therein such as user interface elements 1016. The computer 1000 may also receive programming and data via network communications.

Hence, aspects of the method of identifying a target metric, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine, each of which has at least one processor, storage, and a communication platform connected to a network for identifying a target metric, comprising the steps of:
    measuring a plurality of first type of metrics, that are short-term behavior metrics, computed based on a first period, associated with a first length of time, with respect to each of a plurality of users;
    measuring at least one second type of metric, that are long-term engagement metrics, computed based on a second period, associated with a second length of time, with respect to each of the plurality of users, wherein the second length of time is larger than the first length of time;
    computing correlations between each of the plurality of first type of metrics and each of the at least one second type of metric with respect to the plurality of users; and
    selecting one of the plurality of first type of metrics as a target metric based on the correlations, wherein
    the target metric has a largest correlation with one or more of the at least one second type of metric, and
    the target metric is used for optimizing long-term engagement between users and an application.

2. The method of claim 1, wherein the plurality of users are identified based on interactions between each of the plurality of users and one or more pieces of content that are provided to the user in the first period.

3. The method of claim 2, wherein
    the first type of metric relates to a degree of interaction between a user and the one or more pieces of content that are provided to the user in the first period; and
    the second type of metric relates to a degree of engagement between the user and an application that provides the one or more pieces of content to the user in the second period.

4. The method of claim 1, wherein the second period is after the first period.

5. The method of claim 3, wherein the first type of metric and the second type of metric are measured by at least one of:
    a web beacon embedded in the one or more pieces of content and/or the application,
    event logs, and
    a tool bar placed on the application.

6. The method of claim 3, wherein the application is to be optimized based on the target metric.

7. The method of claim 3, wherein the one or more pieces of content are personalized content recommended to the plurality of users by the application.

8. A system having at least one processor for identifying a target metric, the system comprising:
    a short-term behavior metrics measurement unit implemented on the at least one processor and configured to measure a plurality of first type of metrics, that are short-term behavior metrics, computed based on a first period, associated with a first length of time, with respect to each of a plurality of users;
    a long-term engagement metrics measurement unit implemented on the at least one processor and configured to measure at least one second type of metric, that are long-term engagement metrics, computed based on a second period, associated with a second length of time, with respect to each of the plurality of users, wherein the second length of time is larger than the first length of time;
    a correlation analysis unit implemented on the at least one processor and configured to compute correlations between each of the plurality of first type of metrics and each of the at least one second type of metric with respect to the plurality of users; and
    a target metric identification unit implemented on the at least one processor and configured to select one of the plurality of first type of metrics as a target metric based on the correlations, wherein
    the target metric has a largest correlation with one or more of the at least one second type of metric, and
    the target metric is used for optimizing long-term engagement between users and an application.

9. The system of claim 8, wherein the plurality of users are identified based on interactions between each of the plurality of users and one or more pieces of content that are provided to the user in the first period.

10. The system of claim 9, wherein
    the first type of metric relates to a degree of interaction between a user and the one or more pieces of content that are provided to the user in the first period; and
    the second type of metric relates to a degree of engagement between the user and an application that provides the one or more pieces of content to the user in the second period.

11. The system of claim 8, wherein the second period is after the first period.

12. The system of claim 10, wherein the first type of metric and the second type of metric are measured by at least one of:
    a web beacon embedded in the one or more pieces of content and/or the application,
    event logs, and
    a tool bar placed on the other application.

13. The system of claim 10, wherein the application is to be optimized based on the target metric.

14. The system of claim 10, wherein the one or more pieces of content are personalized content recommended to the plurality of users by the application.

15. A non-transitory machine-readable medium having information recorded thereon for identifying a target metric, wherein the information, when read by a machine, causes the machine to perform the following:

measuring a plurality of first type of metrics, that are short-term behavior metrics, computed based on a first period, associated with a first length of time, with respect to each of a plurality of users;

measuring at least one second type of metric, that are long-term engagement metrics, computed based on a second period, associated with a second length of time, with respect to each of the plurality of users, wherein the second length of time is larger than the first length of time;

computing correlations between each of the plurality of first type of metrics and each of the at least one second type of metric with respect to the plurality of users; and selecting one of the plurality of first type of metrics as a target metric based on the correlations, wherein the target metric has a largest correlation with one or more of the at least one second type of metric, and the target metric is used for optimizing long-term engagement between users and an application.

16. The medium of claim 15, wherein the plurality of users are identified based on interactions between each of the plurality of users and one or more pieces of content that are provided to the user in the first period.

* * * * *